(12) United States Patent
Nusier et al.

(10) Patent No.: US 9,630,578 B1
(45) Date of Patent: Apr. 25, 2017

(54) RAIL ATTACHED TO A SUB-FRAME AND EXTENDING OUTBOARD OF THE FRAME RAIL

(71) Applicant: Ford Global Technologies, LLC, Dearborn, MI (US)

(72) Inventors: Saied Nusier, Canton, MI (US); Mohamed Ridha Baccouche, Ann Arbor, MI (US); Saeed David Barbat, Novi, MI (US); Jamel E. Belwafa, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/136,381

(22) Filed: Apr. 22, 2016

(51) Int. Cl.
*B60R 19/00* (2006.01)
*B60R 19/02* (2006.01)
*B60R 19/34* (2006.01)

(52) U.S. Cl.
CPC ............ *B60R 19/023* (2013.01); *B60R 19/34* (2013.01)

(58) Field of Classification Search
CPC .... B62D 21/15; B62D 21/152; B62D 21/155; B62D 25/08; B60R 19/023; B60R 19/34
USPC .............................. 296/187.09, 187.1, 203.02
See application file for complete search history.

(56) References Cited

U.S. PATENT DOCUMENTS

| | | | | |
|---|---|---|---|---|
| 6,068,330 A * | 5/2000 | Kasuga | ................ | B62D 29/008 188/377 |
| 7,341,299 B1 * | 3/2008 | Baccouche | .......... | B62D 21/152 296/203.02 |
| 7,954,884 B2 * | 6/2011 | Kosaka | ................... | B60R 19/12 296/187.09 |
| 8,398,154 B1 * | 3/2013 | Nusier | ................ | B62D 21/152 280/784 |
| 8,894,129 B2 * | 11/2014 | Katou | .................. | B62D 21/155 296/187.03 |
| 8,985,258 B1 | 3/2015 | Midoun et al. | | |
| 8,991,544 B1 | 3/2015 | Stratten et al. | | |
| 9,272,678 B2 | 3/2016 | Nam et al. | | |
| 2011/0221213 A1 * | 9/2011 | Riviere | ................ | B62D 21/152 293/132 |

* cited by examiner

*Primary Examiner* — Joseph D Pape
(74) *Attorney, Agent, or Firm* — Jason C. Rogers; Brooks Kushman P.C.

(57) ABSTRACT

A front end structure for a vehicle comprising a bumper, a crush can attaching the bumper to a frame rail, a sub-frame supporting an engine, and an impact spreading rail attached to a front transverse rail of the sub-frame. The impact spreading rail extends perpendicularly outboard relative to the frame rail and upward to a location vertically aligned with the bumper. The impact spreading rail is impacted after the bumper in a collision to spread collision deformation outside the frame rail.

17 Claims, 6 Drawing Sheets

|  |  |  | Weighting | Note | Symbol |
|---|---|---|---|---|---|
| Homogenity / Geometry |  | 95 | 75% | 3.4 | ○ |
| Energy Input |  |  | 25% | 3.4 | ○ |
|  | Barrier Energy | 79% | 50% | 4.0 | ⊖ |
|  | Δv Barrier | 56.2 km/h | 50% | 2.8 | ○ |
|  | Bottom Out | 0 |  |  |  |
| Overall Rating |  |  |  | 3.4 | ⊖ |

|  | Weighting | Note | Symbol |
|---|---|---|---|
| Homogenity / Geometry | 75% | 3.4 | ○ |
| Energy Input | 25% | 3.4 | ○ |
| Overall Rating |  | 3.4 | ○ |

| Note |
|---|
| ++ ⟶ Very Good |
| + ⟶ Good |
| ○ ⟶ Average |
| ⊖ ⟶ Bare Min |
| -- ⟶ Poor |

*Fig-7*

|  |  |  | Weighting | Note | Symbol |
|---|---|---|---|---|---|
| Homogenity / Geometry |  | 66 | 75% | 2.2 | + |
| Energy Input |  |  | 25% | 3.4 | ○ |
|  | Barrier Energy | 77% | 50% | 3.9 | ⊖ |
|  | Δv Barrier | 56.2 km/h | 50% | 2.8 | ○ |
|  | Bottom Out | 0 |  |  |  |
| Overall Rating |  |  |  | 2.5 | + |

|  | Weighting | Note | Symbol |
|---|---|---|---|
| Homogenity / Geometry | 75% | 2.2 | ⊕ |
| Energy Input | 25% | 3.4 | ○ |
| Overall Rating |  | 2.5 | ⊕ |

| Note |
|---|
| ++ ⟶ Very Good |
| + ⟶ Good |
| ○ ⟶ Average |
| ⊖ ⟶ Bare Min |
| -- ⟶ Poor |

*Fig-8*

RAIL ATTACHED TO A SUB-FRAME AND EXTENDING OUTBOARD OF THE FRAME RAIL

TECHNICAL FIELD

This disclosure relates to a spreading rail attached to a vehicle underbody structure that is subjected to testing in a collision with a progressive deformable barrier and evaluated, in part, based upon the homogeneity of the deformation of the barrier.

BACKGROUND

Vehicles are subject to a wide variety of tests that are mandated by government regulations and insurance certifications. Tests for energy absorption, durability and passenger protection are conducted on new vehicles. Intrusions into the passenger compartment are analyzed in several tests related to occupant protection in a collision.

Due to the numerous types of collisions, new tests are constantly being proposed to improve occupant safety, pedestrian safety and the safety of other vehicle occupants. A new vehicle test for testing a vehicle is a test entitled "2020 Euro NCAP test" that tests for intrusions and also tests for compatibility of a vehicle design with other vehicles that may be involved in a collision. One measure of compatibility in the NCAP test relates to the homogeneity of the deformation of a moving barrier that collides with a moving vehicle. Deeper deformation areas on the movable barrier are undesirable and result in unsatisfactory test results.

When modifying elements a vehicle design to meet the requirements of one test, care must be taken to avoid adversely affecting other test results. For example, changes made to improve homogeneity test results cannot be made in such a way as to compromise passenger protection as measured in other tests.

The above problems and other problems are addressed by this disclosure as summarized below.

SUMMARY

According to one aspect of this disclosure, a front end structure is disclosed for a vehicle comprising a bumper, a crush can attaching the bumper to a frame rail, a sub-frame supporting an engine, and a spreading rail attached to a front transverse rail of the sub-frame. The spreading rail extends perpendicularly outboard relative to the frame rail and upward to a location vertically aligned with the bumper.

According to another aspect of this disclosure, a front end structure is disclosed for a vehicle that includes a pair of frame rails and a pair of crush cans assembled to the frame rails. A bumper is assembled to the crush cans. A sub-frame is assembled below the frame rails and has a front rail extending in a transverse direction. A pair of rails is assembled to the front rail and extends to a location at a height of the bumper and laterally outboard of the front rail.

According to a further aspect of this disclosure, a front end structure is disclosed for a vehicle that includes a bumper and crush cans disposed between the vehicle and the bumper. A sub-frame is configured to support an engine of the vehicle. A recessed body has an attachment portion attached to the sub-frame and an outer portion that extends outboard of a frame rail. The recessed body is impacted after the bumper in a collision to spread collision deformation outside the frame rail.

Other aspects of this disclosure that may be incorporated in any of the above described front end structures may further comprise providing the spreading rail (or the recessed body) as a tubular rail. The tubular rail may include a plurality of internal ribs. The spreading rail (or the recessed body) may be attached to the sub-frame at a location vertically below the crush can. The spreading rail (or the recessed body) may include an attachment portion and an outer portion that is joined to the attachment portion at a bend. The spreading rail (or the recessed body) may be disposed below the crush can and longitudinally recessed relative to the bumper.

The above aspects of this disclosure and other aspects will be described below with reference to the attached drawings.

BRIEF DESCRIPTION OF THE DRAWINGS

FIG. 7 is a chart showing the results of a 2020 Euro NCAP simulated test of a vehicle having a front end structure that does not include the impact spreading rail shown in FIGS. 3-5 in terms of homogeneity of the deformation of the movable barrier.

FIG. 8 is a chart showing the results of a 2020 Euro NCAP simulated test of a vehicle having a front end structure as shown in FIGS. 3-6 in terms of homogeneity of the deformation of the movable barrier.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Relative terms for spacial relationships as referred to in this disclosure should be understood as being vehicle directions with the vehicle having a "longitudinal direction" that extends from the front of the vehicle to the rear of the vehicle. The "lateral direction" extends in the cross-vehicle direction. A "centerline" of the vehicle extends in the longitudinal direction and is at the lateral center of the vehicle. For example, the term "outboard of the frame rails" refers to a side of the frame rails that is on the opposite side of the frame rails from the centerline. The "outward direction" is the direction extending away from the centerline.

Figure 1:
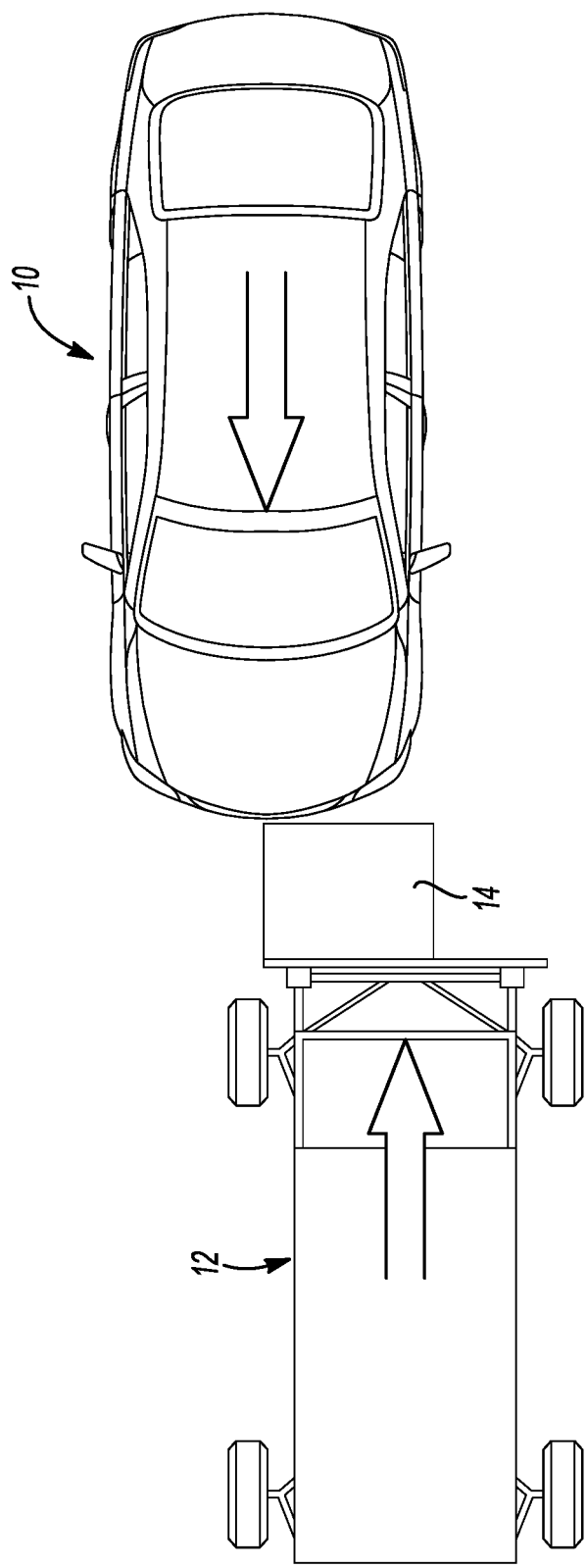
FIG. 1 is a diagrammatic top plan view of a vehicle and a movable deformable barrier just prior to an impact in a 2020 Euro NCAP Mobile Progressive Deformable Barrier Front Offset Impact Test.

Referring to FIG. 1, a vehicle 10 is shown with a movable barrier vehicle 12 just prior to a collision in a 2020 Euro NCAP Test. The movable barrier vehicle 12 supports and maneuvers a deformable barrier 14 comprising a tube-shaped assembly of hexagonal crush tubes 16.

Figure 2:
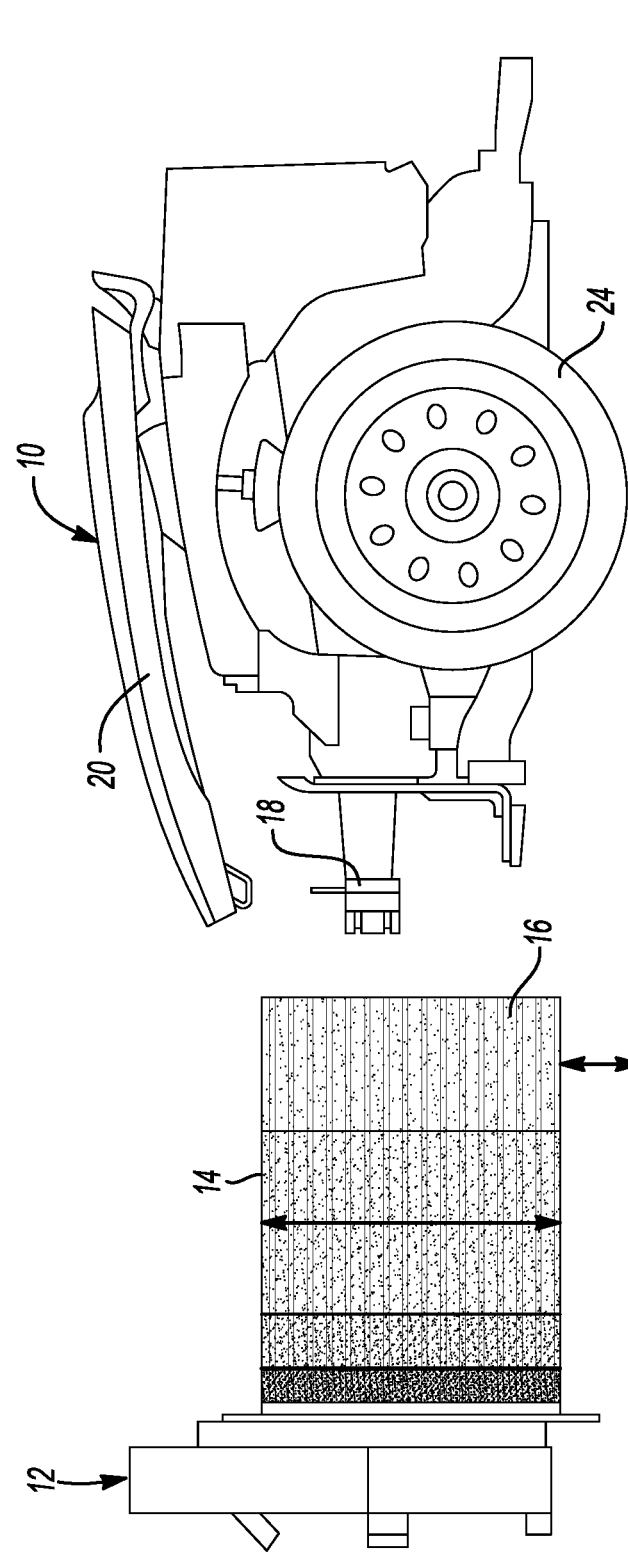
FIG. 2 is a diagrammatic side elevation view of the vehicle and the movable deformable barrier shown in FIG. 1 in the 2020 Euro NCAP Mobile Progressive Deformable Barrier Front Offset Impact Test.

Referring to FIG. 2, the vehicle 10 is shown with the movable barrier vehicle 12 and the deformable barrier 14 disposed just in front of a bumper assembly 18 of the vehicle 10. The bumper assembly 18 is shown below the hood 20 of the vehicle 10 and in front of the front wheel 24 of the vehicle 10. In the test, the vehicle 10 having a mass of 1800 Kg is moved at 50 Km/hr while the movable barrier vehicle 12 having a mass of 1400 Kg is moved at 50 Km/hr in an offset head-on collision. Following the collision, the deformable barrier 14 is scanned with a 3-D scanner that is used to measure the deformation of the deformable carrier 14 as a result of the off-set collision. The extent to which the deformable barrier 14 has consistent deformation across the face of the deformable barrier 14 it is considered to be homogenous while a non-uniform deformation of the deformable barrier 14 is considered to be non-homogenous. Based upon the 3-D scanning data, the value for homogeneity/geometry is assigned as the test result.

Figure 3:
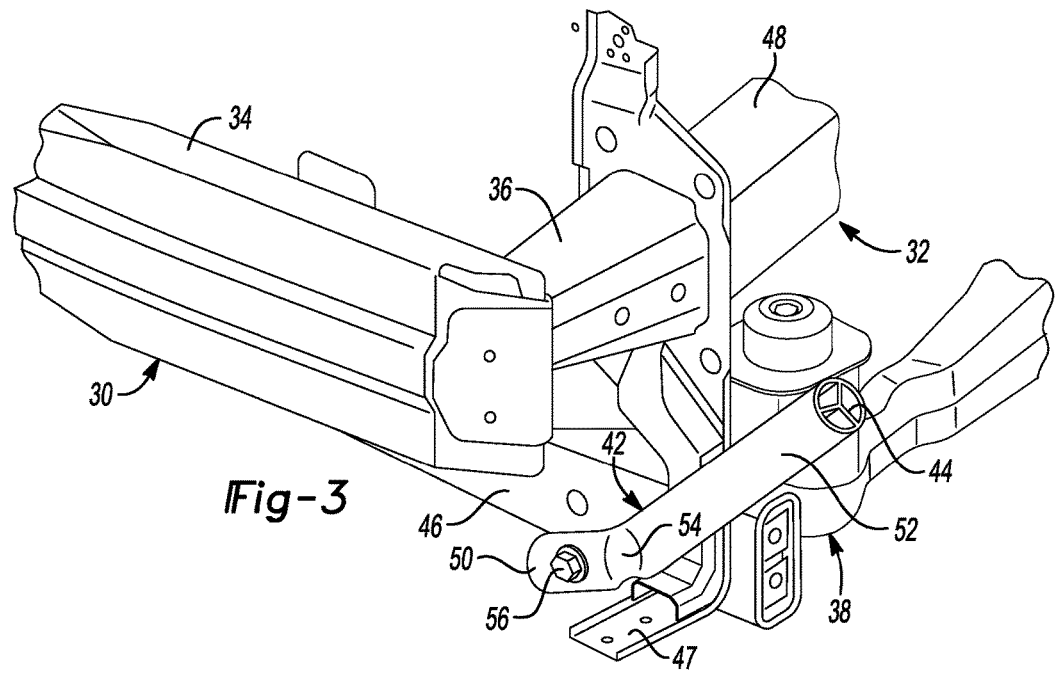
FIG. 3 is a fragmentary perspective view of a front end structure of a vehicle including an impact spreading rail attached to a sub-frame.

FIG. 3 illustrates a front end structure 30 for a vehicle 32 in perspective. A bumper 34 is secured to the vehicle 32 by a crush can 36. It should be understood that the front end structure 30 as illustrated is one-half of the front end structure 30 and that a mirror image of the front end structure is provided on the opposite side of the vehicle.

A sub-frame 38 of the vehicle 32 supports the engine 40 (diagrammatically shown in FIG. 4) of the vehicle 32. A spreading rail 42, also referred to herein as a recessed body, is a tubular member that includes internal ribs 44. The spreading rail 42 is secured to a front rail 46 of the sub-frame 38. Alternatively, the spreading rail 42 can be attached to the bracket 47 that extends downward from the crush can 36 to the location where the bracket 47 is adjacent the front rail 46. While the illustrated embodiment includes a tubular spreading rail 42, it should be understood that the spreading rail could also be fabricated from two "C-shaped" channels that are welded together, or may be provided in other shapes or formed of a variety of different materials.

A frame rail 48 is partially shown that supports the body of the vehicle 32. The frame rail 48 may be a separately formed frame rail or may be an integral frame rail for a uni-body constructed vehicle that has a frame formed as part of the body of the vehicle.

The spreading rail 42 includes an attachment portion 50 and an outer portion 52. A bend 54 may be formed in the spreading rail 42 between the attachment portion 50 and the outer portion 52. A fastener 56, or bolt, is used to secure the spreading rail 42 to the front rail 46 of the sub-frame 38.

Figure 4:
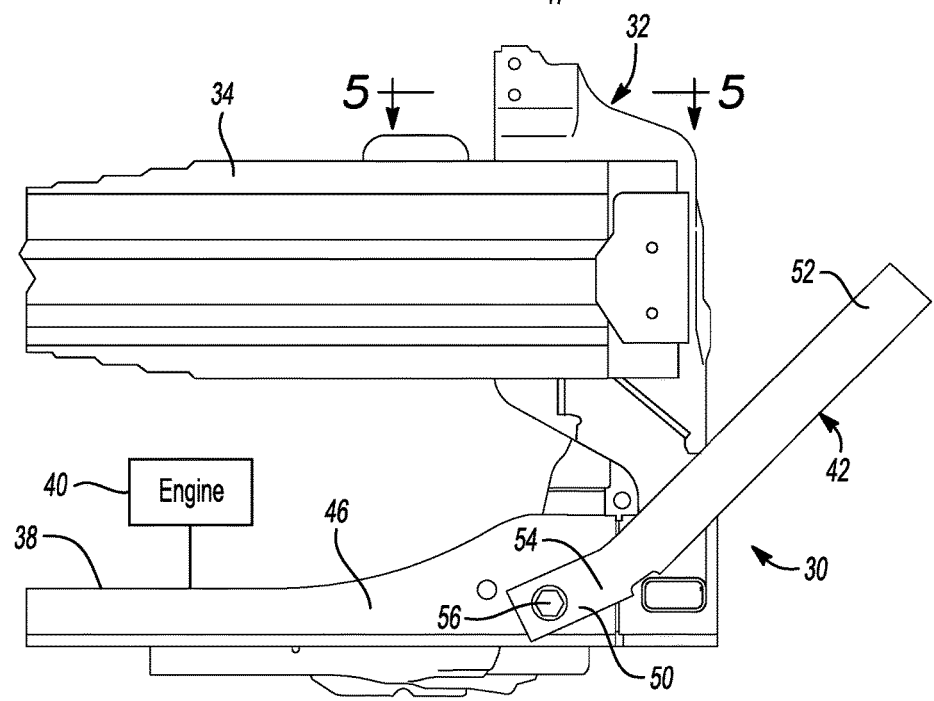
FIG. 4 is a fragmentary front elevation view of a front end structure of a vehicle including an impact spreading rail attached to a sub-frame.

Referring to FIG. 4, the front end structure 30 is shown in a front elevation view. The bumper 34 is disposed in front of and above the front rail 46. The bumper 34 is also disposed in front of and above the attachment portion 50 and bend 54 of the impact spreading rail 42. The outer portion 52 of the impact spreading rail 42 extends outboard of the frame rail (shown in FIG. 3). The engine 40 is schematically shown to be supported on the sub-frame 38.

Figure 5:
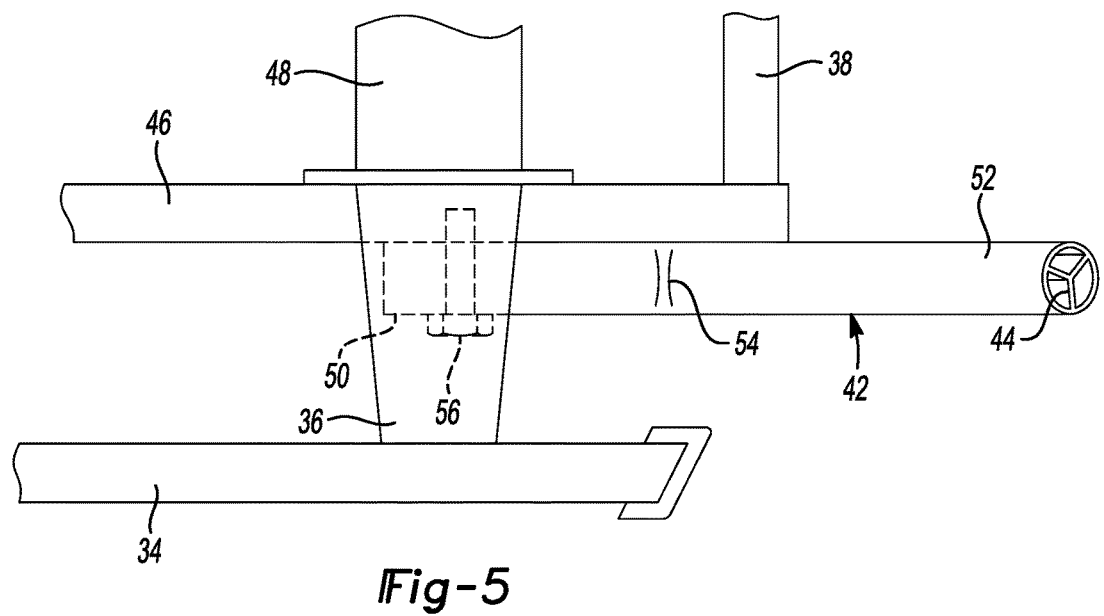
FIG. 5 is a fragmentary top plan view taken along the line 5-5 in FIG. 4.

FIG. 5 provides a fragmentary top plan view taken along the line 5-5 in FIG. 4. The fastener 56 is inserted through the attachment portion 50 of the spreading rail 42 and into the front rail 46 of the sub-frame 38. The spreading rail 42 is attached to the front rail 46 of the sub-frame 38 by a fastener 56. The bumper 34 is attached to the crush can 36. The outer portion 52 of the impact spreading rail 42 extends outboard of the frame rail 48 in a transverse plane perpendicular to the frame rail 48.

In a collision of a movable barrier vehicle (shown in FIGS. 1 and 2) with the bumper 34, impact is first made with the bumper 34 that causes the crush can 36 to collapse absorbing energy from the collision. After the bumper 34 collapses the crush can 36, the spreading rail 42 is engaged by the movable barrier vehicle and begins to absorb energy from the collision. The spreading rail 42 spreads the deformation caused by the collision across the portion of the vehicle outboard of the bumper. By spreading the deformation, the homogeneity of the impact on the movable barrier vehicle 12 (shown in FIGS. 1 and 2) is improved as will be explained with reference to FIGS. 7-8 below.

Figure 6:
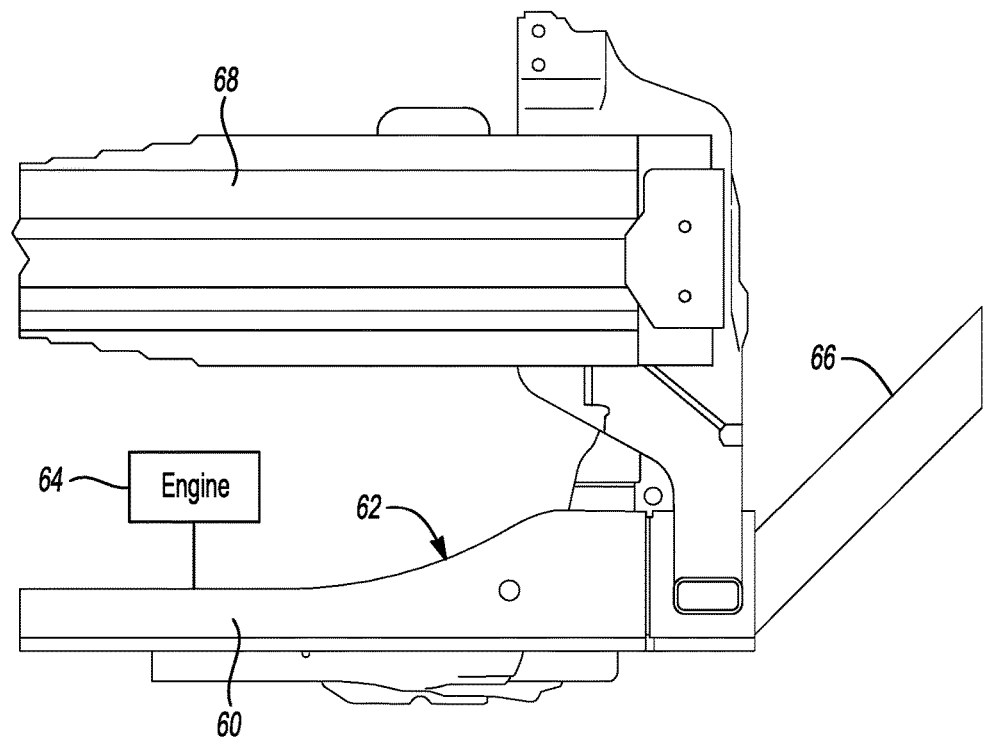
FIG. 6 is a fragmentary front elevation view of an alternative embodiment of a front end structure of a vehicle including an impact spreading rail that is an extension of a front rail of a sub-frame.

Referring to FIG. 6, an alternative embodiment is illustrated wherein a front rail 60 of a sub-frame 62 supporting the engine 64 includes an integral spreading rail 66. The integral spreading rail 66 is an extension of the front rail 60 that extends outwardly and upward from the sub-frame 62 to a location outboard of the frame rail 48 (shown in FIG. 3) and laterally outboard of the bumper 68.

Referring to FIG. 7, a chart rating the homogeneity/geometry of the barrier after a 2020 Euro NCAP simulated test collision is presented that reflects that the front end structure without an impact spreading rail was rated at 95. The homogeneity/geometry rating is weighted at 75% and was determined to be "Average." In the simulated test, a value is also assigned for the energy input to the movable barrier was rated at 3.4 and was given a 25% weight. The energy input is a product of the barrier energy rating of 79% and the delta velocity of the barrier of 56.2 Km/hr. The barrier energy value and delta velocity barrier values were each weighted 50% and resulted in an "Average" acceptability rating for the barrier energy and an "Average" acceptability rating for the delta velocity barrier value. The overall rating for the simulated bumper beam was evaluated as being "Average."

Referring to FIG. 8, a chart rating the homogeneity/geometry test for a front end underbody structure made according to the embodiment of FIGS. 3-6 resulted in a homogeneity/geometry result of 66. The barrier energy and delta velocity barrier values were held the same as in the test reported in FIG. 7, but the homogeneity/geometry result of 95 improved to a 66 that is rated as a "Good" acceptability rating. When the homogeneity/geometry rating was combined with the energy input value and weighted as described above, the overall rating of the bumper with the reduced height and cut-away wall in the central portion improved to a "Good" acceptability rating and represents a substantial improvement over the test result reported in FIG. 7.

Figure 9:
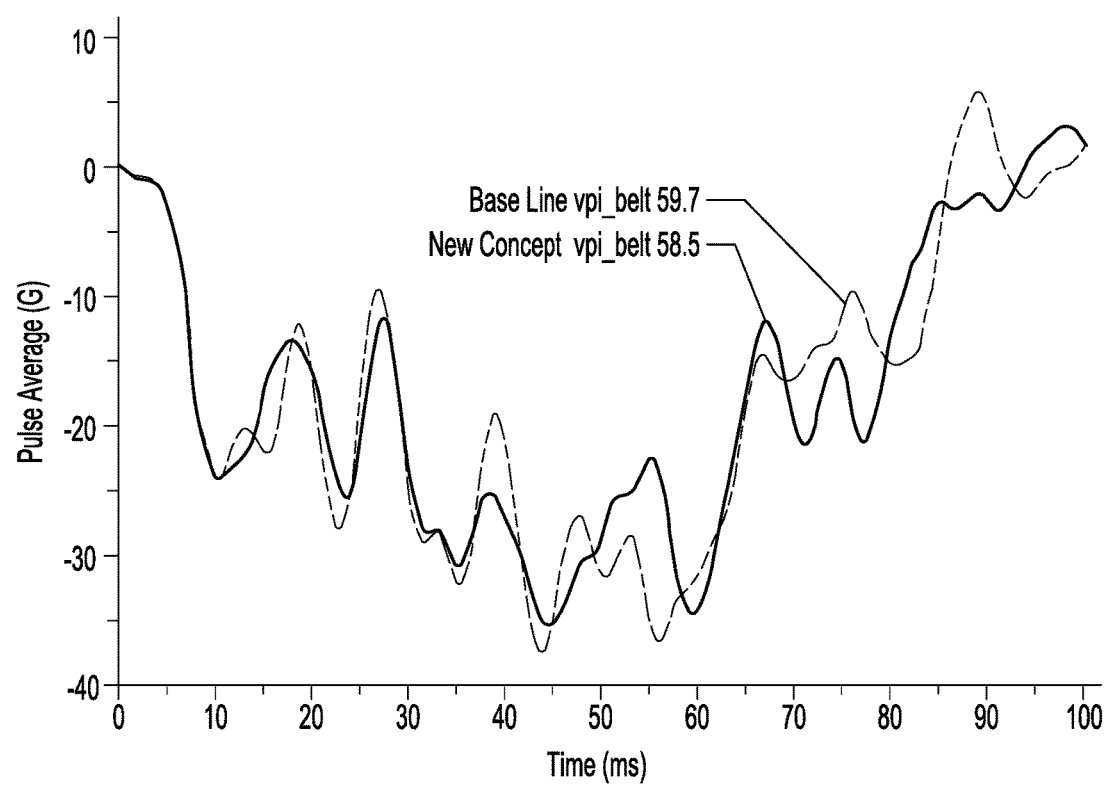
FIG. 9 is a graph showing the Pulse Average (G) over time (ms) comparing the front end tested in FIG. 7 to the front end structure tested in FIG. 8.

Referring to FIG. 9, a graph comparing the NCAP Vehicle Pulse Index (VPI) of the front end structure without an impact spreading rail is compared to a front end structure made according to the embodiment of FIGS. 3-6. The embodiment of FIGS. 3-6 resulted in an enhanced VPI showing a reduction of 1.2 G in the VPI.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A front end structure for a vehicle comprising:
   a bumper;
   a crush can attaching the bumper to a frame rail;
   a sub-frame supporting an engine; and
   a spreading rail attached below the crush can to a front transverse rail of the sub-frame, the spreading rail extending outboard of the frame rail and upward to a location vertically aligned with the bumper.

2. The front end structure of claim 1 wherein the sub-frame includes a front rail, and wherein the spreading rail is an extension of the front rail.

3. The front end structure of claim 1 wherein the spreading rail is a tubular rail that includes a plurality of internal ribs.

4. The front end structure of claim 1 wherein the spreading rail includes an attachment portion and an outer portion that is joined to the attachment portion at a bend.

5. The front end structure of claim 1 wherein the spreading rail is attached to a bracket disposed below the crush can, in front of the front rail and longitudinally recessed relative to the bumper.

6. A front end structure for a vehicle comprising:
   a pair of frame rails;
   a pair of crush cans assembled to the frame rails;
   a bumper assembled to the crush cans;
   a sub-frame assembled below the frame rails and having a front rail extending in a transverse direction; and
   a pair of rails assembled to the front rail and extending to a location at a height of the bumper and laterally outboard of the front rail, wherein each of the pair of rails is attached to one of the front rails of the sub-frame at locations below one of the crush cans.

7. The front end structure of claim 6 wherein the pair of rails are tubular rails.

8. The front end structure of claim 7 wherein the tubular rails include a plurality of internal ribs.

9. The front end structure of claim 6 wherein the pair of rails each include an attachment portion and an outer portion that is joined to the attachment portion at a bend.

10. The front end structure of claim 6 wherein each of the pair of rails is disposed below one of the crush cans and longitudinally recessed relative to the bumper.

11. A front end structure of a vehicle comprising:
    a bumper;
    a crush can disposed between a frame rail of the vehicle and the bumper;
    a sub-frame configured to support an engine of the vehicle; and
    a spreading rail supported by the sub-frame that extends from the sub-frame to a location outboard of a frame rail, wherein the spreading rail is impacted after the bumper in a collision to spread collision deformation outside the frame rail, wherein the spreading rail is attached to a front rail of the sub-frame at a location below one of the crush cans.

12. The front end structure of claim 11 wherein the spreading rail is a tubular rail.

13. The front end structure of claim 12 wherein the tubular rail includes a plurality of internal ribs.

14. The front end structure of claim 11 wherein the spreading rail includes an attachment portion and an outer portion that is joined to the attachment portion at a bend.

15. The front end structure of claim 11 wherein the spreading rail is longitudinally recessed relative to the bumper.

16. The front end structure of claim 11 wherein the sub-frame includes a front rail, and wherein the spreading rail is an extension of the front rail.

17. The front end structure of claim 11 wherein the spreading rail is attached to a bracket assembled behind the crush cans and in front of the front rail.

* * * * *